Dec. 22, 1942.   A. P. WOODS   2,305,835
VARIABLE LEVERAGE GEARING
Filed March 20, 1941   4 Sheets-Sheet 1
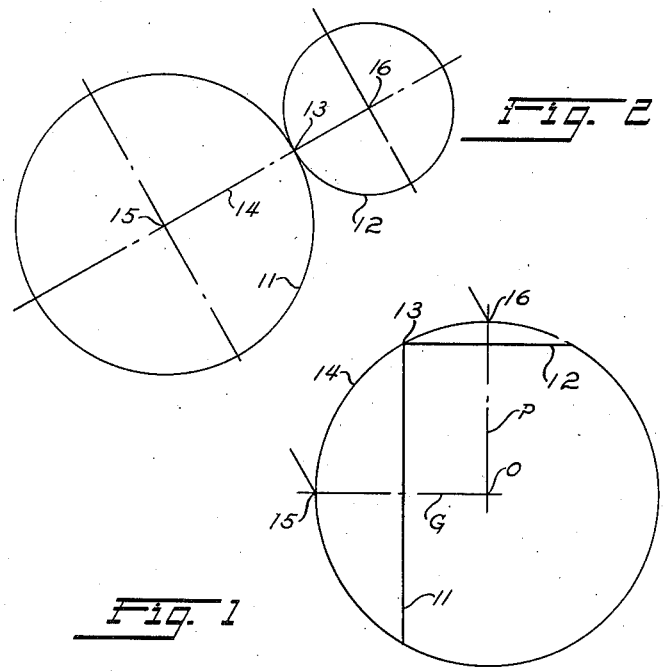
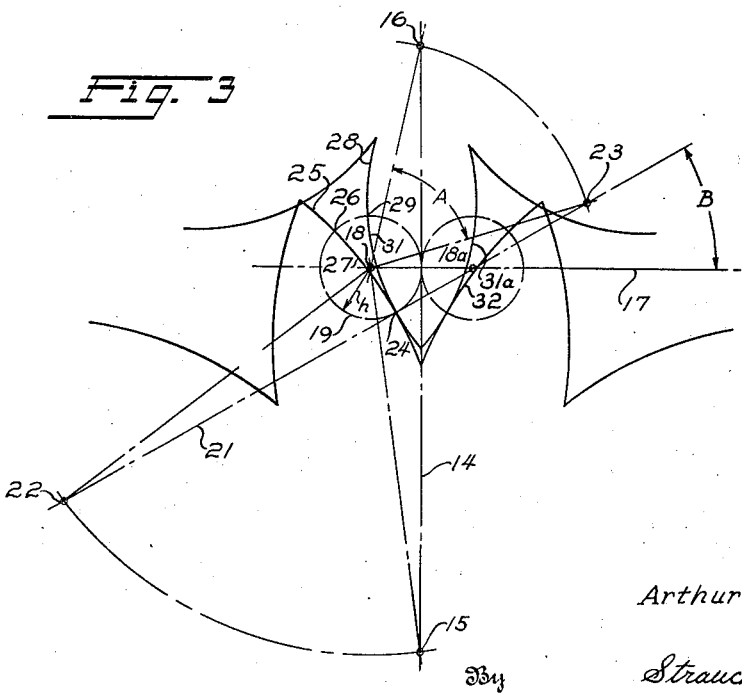
Inventor
Arthur P. Woods
By Strauch & Hoffman
Attorneys

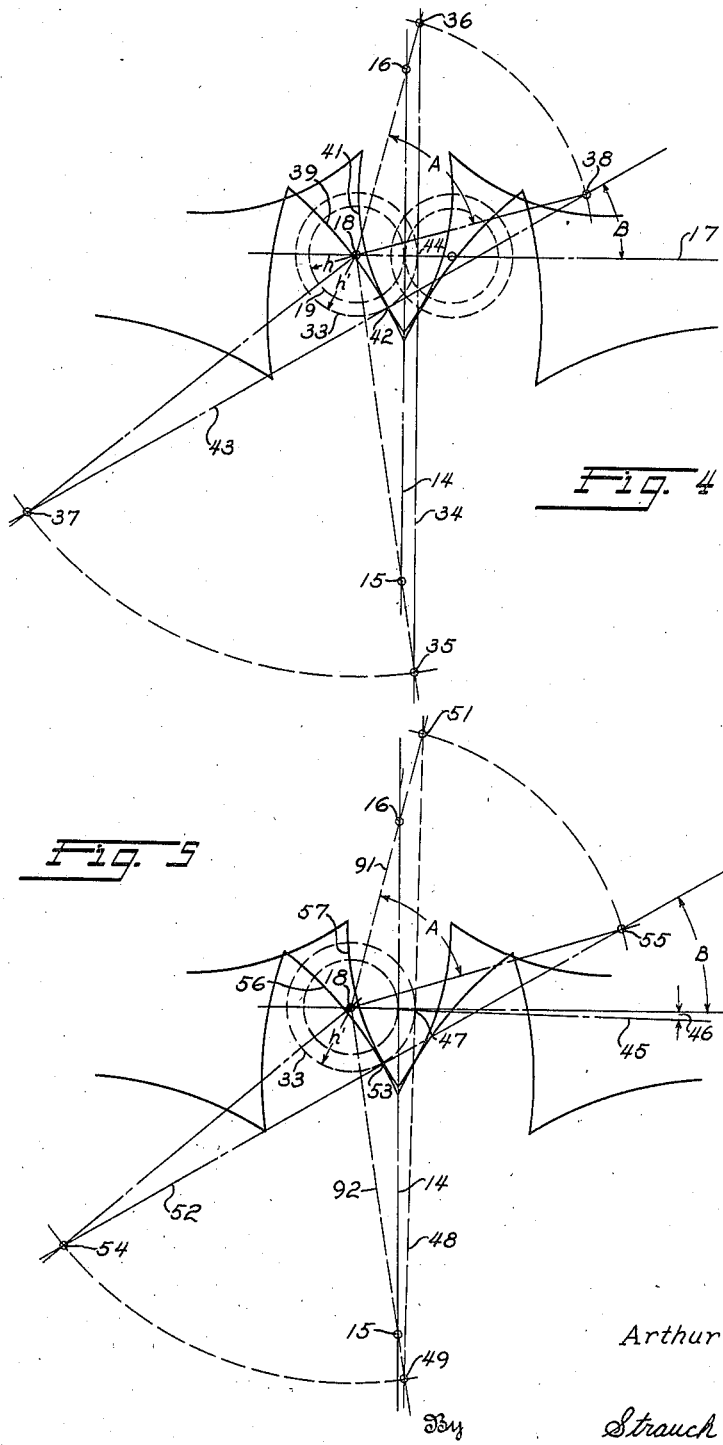

Dec. 22, 1942.  A. P. WOODS  2,305,835
VARIABLE LEVERAGE GEARING
Filed March 20, 1941  4 Sheets-Sheet 3
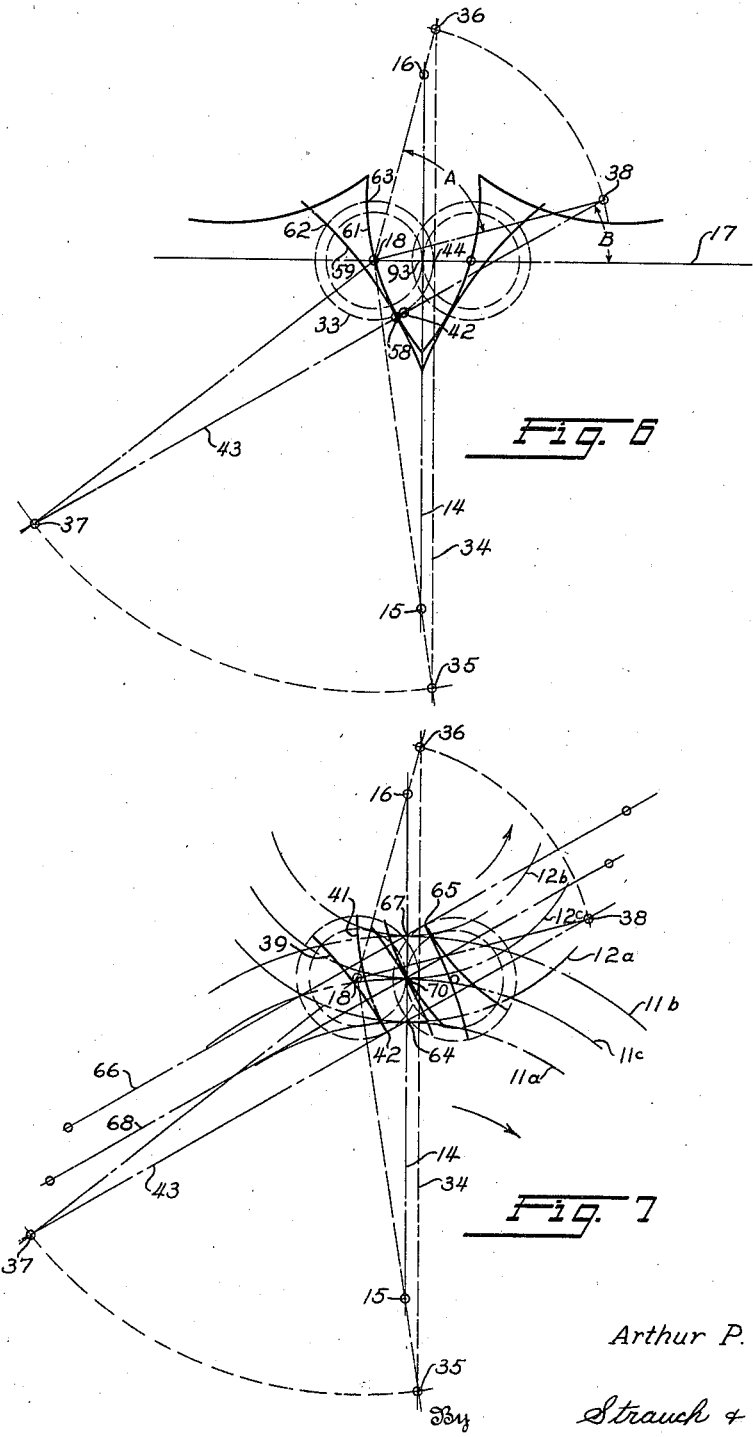

Dec. 22, 1942. A. P. WOODS 2,305,835
VARIABLE LEVERAGE GEARING
Filed March 20, 1941 4 Sheets-Sheet 4

Inventor
Arthur P. Woods
By Strauch & Hoffman
Attorneys

Patented Dec. 22, 1942

2,305,835

UNITED STATES PATENT OFFICE 2,305,835

VARIABLE LEVERAGE GEARING

Arthur P. Woods, Detroit, Mich., assignor to The Timken-Detroit Axle Company, Detroit, Mich., a corporation of Ohio Application March 20, 1941, Serial No. 384,380

19 Claims. (Cl. 74—459.5)

The present invention relates to improvements in variable leverage gearing of the type used in automobile differentials or for similar purposes, and in particular to the tooth forms of such gearing.

Variable leverage gear teeth are of such design as to provide a variation of leverage between the inner or dedendum and the outer or addendum portions of the teeth. The portions of the teeth which mesh to give this variable leverage action are generally called the curves of action of the teeth. The curve of action may also be defined as the working portion of the tooth profile, or the locus of the point of driving contact along a tooth profile.

An important practical consideration in the design of variable leverage bevel gears to be used in automotive differentials is that they should be interchangeable with standard differential bevel gears so that they can be substituted at will for standard differential gears without substituting a whole new differential assembly, requiring special differential and axle housings and related parts. It has not, however, been found practical to design a set of variable leverage bevel gears which can be used in existing differential mechanisms and which will give leverage variation throughout the entire cycle of engagement of the meshing teeth.

In the normal operation of such gears there is a rapid change in leverage when the curve of action of the tooth of one gear leaves meshing engagement with the curve of action of the tooth of its mating gear, and a subsequent pair of teeth begin meshing engagement of their curves of action. This rapid change in leverage is accompanied by a shock to the gear teeth and maximum relative sliding of the meshing teeth giving severe stress and wear conditions at these points in their operation.

Due to the above limitations it is necessary to provide outer profile curves on the gear teeth between the outer points of the curves of action on opposite sides of each tooth. These outer profile curves function to maintain the gears in proper engagement in the period between engagement of successive curves of action of mating teeth. The outer profile curves therefore control the engagement of the gears between successive cycles of leverage variation of the mating gears. If they are not properly formed, interferences and excessive wear and back-lash develop with the result that the gears wear out rapidly and do not give satisfactory practical service.

The curves of action of commercial variable leverage bevel gears have heretofore been laid out in accordance with the principles set forth in Patent No. 2,009,915, issued July 30, 1935, wherein spur gears were laid out on a plane, and bevel gears were laid out on the development of their back cones. In the case of spur gears the curves of action were rolled one on the other to determine the outer tooth profiles. The outer profile curves of the bevel gears generated in an eleven inch Gleason machine by passing the cam for generating the tooth form through a straight sided rack space having an included angle equal to twice the pressure angle of the tooth as disclosed in said patent, however, did not prove to be entirely satisfactory. The outer profile curves were therefore modified in efforts to improve the action of the gears, but these modified curves in practice had undesirable flat spots, which still left room for desirable practical improvements, in eliminating interference, variable back lash, and wear at the ends of the teeth.

Considerable time and money has been spent in attempts to produce satisfactory variable leverage gears and until the development of the present invention none of the gears were entirely satisfactory, although they have been put into wide use, and are considered essential in United States military vehicles.

Variable leverage on high traction differentials embodying the improvements of my present invention and those described in the co-pending application of Charles C. Davis, Serial No. 384,421, filed on even date herewith, have proven more satisfactory than those heretofore manufactured.

Variable leverage gears differ from involute gears in the fact that involute gears have pitch circles which remain constant, while in variable leverage gearing there are instantaneous pitch circles which vary from one instant to another between the position of the inner pitch circle and outer pitch circle during engagement of the teeth along their curves of action, as will be described. Thus there is a pair of instantaneous pitch circles for each relative position of a pair of meshing gears.

In properly developed variable leverage gears, in each relative position of engagement of a mating pair of gears, two points on an engaging tooth, one on each side of the tooth, are in contact with points on the teeth of the meshing gear.

I have found that it is a requirement of properly designed variable leverage gears that the common normals to mating tooth profiles at their point of contact must pass through the point in the line of centers at which the instantaneous pitch circles are tangent.

When one tooth is contacting two adjacent teeth on the mating gear, one such contact will be made by a point on its curve of action and the other contact will be made by a point on the outer tooth profile of the other side of the tooth. In accordance with the above-described requirement, the common normal to the curve of action and to the mating tooth profile at their contact point must pass through the point in the line of centers at which the instantaneous pitch circles are tangent. At the same instant, according to my discovery, the common normal to the outer tooth profile on the other side of the tooth and to the other adjacent mating tooth profile at their point of contact must pass through the same point in the line of centers.

I have also discovered that correct tooth profiles for variable leverage bevel gears satisfying the above-described requirements can be accurately determined by theoretically locating points along these profiles on the surface of a sphere. Necessarily, a substantial number of such points must be located to determine the actual profile of a tooth.

The diameter of the sphere upon which the points are located must be such that the instantaneous pitch circles of the mating gears can lie tangent to each other on the surface of the sphere, and their axes, representing the axes of the corresponding mating gears, will be perpendicular to the plane of said circles and intersect at the center of the sphere. In the case of gears for high-traction automotive differentials, the angle between the axes of the differential pinion and side gears is 90 degrees. Accordingly, the sphere must be of such diameter that the axes of the gear and pinion instantaneous pitch circles intersect at 90° at the center of the sphere and the said pitch circles lie on the surface of the sphere and tangent to each other.

It should be understood that it is not practical to actually make a sphere and locate points on its surface to determine the tooth profiles as described above. However, this can be done theoretically and points on the surface of an imaginary sphere with relation to a point taken as its center can be determined by spherical trigonometrical calculations as will be understood. Similarly, the determination of such points by a graphical solution on the surface of an actual sphere is impractical. This could be done accurately, however, if an accurate spherical surface could be made and proper instruments used. The graphical solution can however be illustrated, and in fact must necessarily be shown, in order to be able to determine the spherical triangles that must be solved by spherical trigonometrical calculations to determine points on the tooth profiles. Of course, whether the profiles are actually determined by an accurate graphical layout on the surface of an actual sphere, or whether they are located on the surface of a theoretical sphere by means of mathematical computations, the final determined profiles will be the same.

Variable leverage bevel gears having tooth profiles determined in the above described manner are more satisfactory than any heretofore devised. Outer tooth profiles are so determined that the common normal to said outer tooth profiles and the mating tooth of the other gear at their point of contact passes through the required point in the line of centers at which the instantaneous pitch circles are tangent, as described. Such outer tooth profiles, together with the curves of action, give tooth profiles which can be successfully generated on quantity production machines without flat spots on the outer tooth profiles. Uniform backlash, which is an important requisite of variable leverage gearing, is secured with tooth forms determined in this manner. Tooth interference is also eliminated, which is an important factor in the maintenance of uniform backlash in the gearing.

Variable leverage straight bevel gears having profiles of the type described are preferably generated in a machine of the type described in Patent No. 1,656,633 having an additional translatory movement imparted to the cutting tool in accordance with the principles set forth in Patent No. 1,937,727. In these machines the tool is carried by a cradle which rotates the tool about the cradle axis at the same time that the tool is reciprocated. The gear being generated is supported and rotated about a work axis which intersects the cradle axis at 90 degrees. After having computed the points on the surface of the theoretical sphere to determine the tooth profile, it can be further assumed that the cradle axis and work axis intersect at the center of this sphere. Then the additional translatory motion that must be given to the cutting tool to pass through the determined points on the surface of the theoretical sphere in order to generate the required tooth profile can be computed. Having computed this required additional motion the conformation of the cams 64 and 65 of Patent No. 1,937,727 can be determined.

I have also discovered principles for developing new tooth forms for variable leverage gearing embodying the principles of Patent No. 2,009,915 but having increased strength in the pinion teeth which are inherently of smaller cross section than the gear teeth when developed in accordance with the principles of that patent, or in accordance with the new principles embodying increased or decreased $h$ as described in the co-pending application of Charles C. Davis, Serial No. 384,421, filed on even date herewith, whereby the variable leverage attained is controlled by varying the length of the curves of action.

This increased strength of the pinion is an advantage in variable leverage gear assemblies to be used in automobile differentials, wherein the pinions are comparatively small and the teeth are unduly weakened at the hub due to the small size of the hub.

The increased thickness and strength of the pinion teeth is obtained by increasing the length of the radius which is used when laying out the curve of action of the pinion teeth, and correspondingly decreasing the length of the radius used in laying out the curve of action of the gear teeth.

When strengthening the pinion teeth in this manner, they can be increased in thickness throughout their whole profile, or only at their base, according to preference, and according to the development used, as will be seen from the description following.

The improvements of my invention are applicable to spiral bevel gears, as well as to straight bevel gears, as will be apparent as the description progresses.

It is the primary object of my invention to provide variable leverage or high traction bevel gearing having improved tooth forms adaptable for use in automotive vehicles.

Another important object is to provide variable leverage gears wherein the tooth profiles are such that the common normal to the curves of action af adjacent teeth at their point of contact will pass through the point in the line of centers at which the instantaneous pitch circles are tangent, and wherein the common normal to the outer tooth profiles and mating teeth at their point of contact will simultaneously pass through the same point.

A further object of my invention is to provide high traction or variable leverage bevel gear tooth forms wherein the curves of action of the mating gears are developed on a spherical surface, the center of which is the intersection of the gear and pinion axes, and wherein the outer tooth profiles are such that the common normal to an outer tooth profile and a mating tooth at their point of contact will pass through the point in the line of centers at which the instantaneous pitch circles are tangent.

It is another important object of my invention to provide variable leverage or high traction spur or bevel gear tooth forms having increased strength in the smaller or pinion gear of the cooperating gear set.

Another object of my invention is to provide variable leverage or high traction bevel gear tooth forms wherein curves of action of the mating gears are developed on a spherical surface, the center of which is the intersection of gear and pinion axes, and the surface of which is the sphere on which the pitch circles of the mating gears are tangent.

Another object of my invention is to provide improved bevel type variable leverage or high traction gearing having increased leverage as a result of a lengthening of the curves of action of the teeth of the meshing gears and to provide a method of developing the tooth forms to the attainment of such end.

It is another object of my invention to provide variable leverage spur or bevel gears having increased ratio of variable leverage and having increased strength in the pinion teeth.

Another object is to provide variable leverage bevel gears having curves of action and outer tooth profiles which can be generated on production gear generating machines without producing flat spots on the outer tooth profiles.

Still further objects of the invention will appear as the description thereof proceeds with reference to the accompanying drawings in which:

Figure 1 is a side elevation of a sphere on which the tooth profiles are determined either by graphical solution or by mathematically finding a series of points thereon which determine the tooth profiles.

Figure 2 is a representation of Figure 1 on a plane surface as it appears from a position perpendicular to the tangent point of the pitch circles of the gear and pinion.

Figure 3 is a view similar to Figure 2, showing the triangulation for determining the profiles of tooth forms of variable leverage bevel gearing on the surface of a sphere.

Figure 4 is a view similar to Figure 3, showing the triangulation for determining the profiles of variable leverage bevel tooth forms having longer curves of action and an increased ratio of variable leverage.

Figure 5 is a view similar to Figure 4 and showing the triangulation for gears having increased strength in the teeth of the pinion gear.

Figure 6 is a view similar to Figure 4 and showing the triangulation for another embodiment of gears having increased strength in the teeth of the pinion gear.

Figure 7 is a view showing the gear and pinion in three positions during meshing engagement of a curve of action of a gear tooth with the curve of action of a pinion tooth, together with the instantaneous pitch circles at each position.

Figure 8:
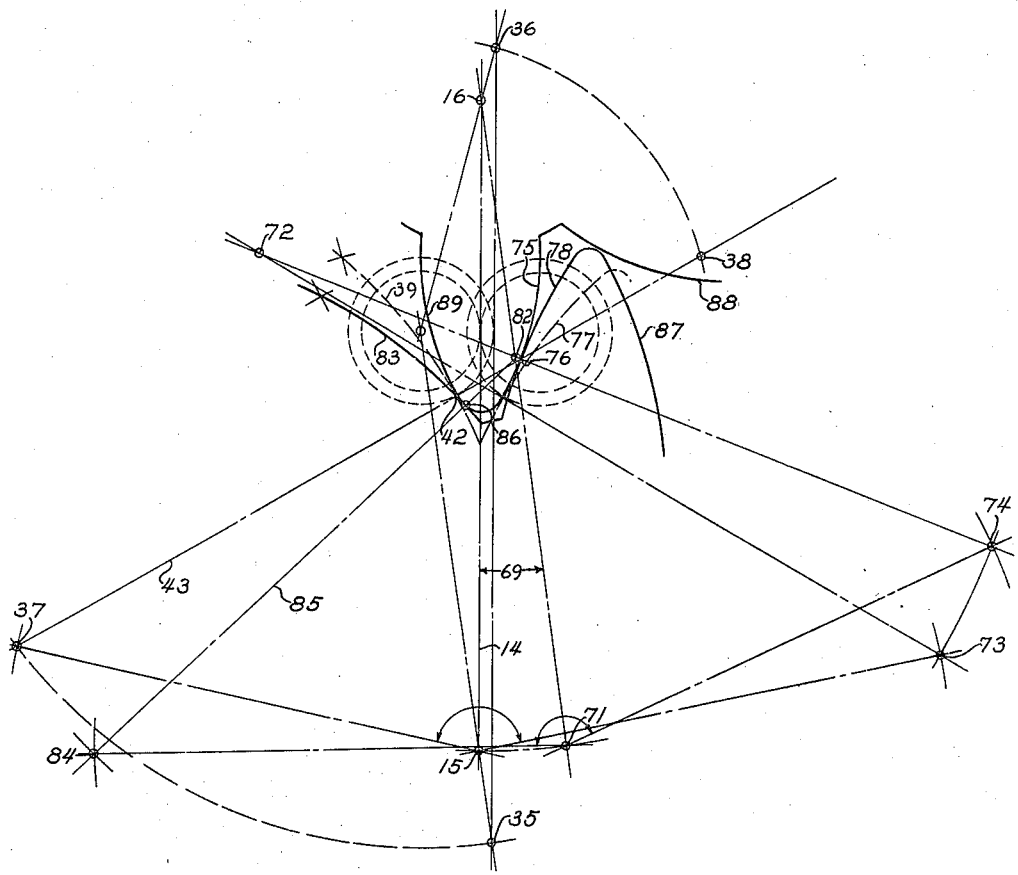
Figure 8 is a view showing the method of determining the outer tooth profiles of the gears whereby a common normal to an outer tooth profile and the mating tooth on the other gear will pass through the point in the line of centers at which the instantaneous pitch circles are tangent.

In Figure 1 of the drawings is shown a side view of a theoretical sphere having a center 0 at which the axes G and P of a bevel gear and pinion intersect at 90°. 11 and 12 represent the pitch circles of the bevel gear and pinion respectively, which rotate about the axes G and P. The pitch circles 11 and 12 are tangent at point 13 which lies on the arc 14 of a great circle extending between 15 and 16 which are the intersections of the axes G and P respectively with the surface of the sphere.

To illustrate the improvements of the present invention, most of the construction can more conveniently be illustrated on a plane surface than on the surface of a sphere. While these illustrations will be distorted from what they would be if they were true projections onto a plane surface, the description will be in terms of spherical geometry, to eliminate confusion.

Accordingly, in Figure 2 is shown a representation on a plane of the same elements shown in Figure 1 viewed from a position above and to the left of Figure 1. In Figure 2, 14 is the arc of the great circle extending between 15 and 16 of Figure 1, which are the intersections of the axes G and P with the surface of the sphere. The circles 11 and 12 of Figure 2 are the pitch circles seen as straight lines 11 and 12 in Figure 1, and representing small circles having 15 and 16 as poles in Figure 1. Thus in the planar representation, straight lines will represent arcs of great circles about poles of the sphere and circular arcs having centers will represent arcs of small circles about centers or poles on the sphere, etc.

*Development of curves of action*

Figure 3 shows the layout for determining the curves of action of bevel tooth forms for variable leverage gears embodying the principles set forth in Patent No. 2,009,915, but developed on the surface of a sphere in accordance with my invention.

In Figure 3, 15 and 16 are the points on the surface of a sphere where the axes of the gear and pinion pass through or intersect its surface. The center of the sphere is the point where the axes of the gear and pinion intersect. In the case of gears to be used in automotive differentials these axes will intersect at 90°, as shown in Figure 1.

The basic triangulation for determining the curves of action of the tooth forms will now be described. It is to be understood that in the following description the graphical references are made for convenient illustrative purposes, and that in practice all of the points found are actually located on the surface of a theoretical sphere by spherical trigonometrical computations.

The line 14 between points 15 and 16 represents the arc of a great circle connecting the points where the gear and pinion axes pierce the surface of the sphere.

A spherical triangle is located, having sides determined by rotating arc 14 about 16 as a pole and through an angle equal to 360° divided by four times the number of teeth in the pinion, and then rotating the arc about 15 as a pole, through an angle equal to 360° divided by four times the number of teeth in the gear. The two arcs intersect at 18 and the spherical triangle 15—16—18 results. Great circle arc 17 is drawn through 18 and perpendicular to 14. From point 18 as a pole a small circle 19, tangent to arc 14 at 18a is determined, having a radius $h$.

With its vertex 18 as a pole, the spherical triangle 15—16—18 is rotated through an angle A such that the rotated base 14 assumes the position shown at 21 which is at the required pressure angle B with the great circle arc 17. The poles 15 and 16 thus assume the positions shown at 22 and 23 and the small circle 19 is tangent to the base 21 at 24.

The angle A through which the triangle is rotated is calculated by spherical trigonometry. Thus, where the radius $h$ is equal to the great circle arc 18—18a, and B is the desired pressure angle, the value of A can be found from the relationships in $$A = \frac{\cos B}{\cos h}$$

As an example, if the pressure angle desired is 25° the value of A will be found to be 65° 43′ 31″.

From 22 as a pole, an arc 25 of a small circle is located, cutting 19 and 21 at 24, and the small circle 19 also at point 26. The arc 27 which lies in the small circle 19 between points 24 and 26 is the curve of action of a tooth on the gear.

From 23 as a pole, an arc of a small circle 28 is located, cutting 19 and 21 at 24 where it is also tangent to arc 25, and cutting the small circle 19 also at point 29. The portion 31 of the arc 28 which lies in the small circle 19 between the points 24 and 29 is the curve of action of a mating tooth on the pinion.

The other curve of action 31a of the pinion tooth is symmetrically located on the other side of the great circle arc 14 and, similarly, curve of action 32 is symmetrically located with respect to 27.

After finding point 24 which is common to the curves of action 27 and 31 and also points 26 and 29, then other points on the curves of action 27 and 31 must be computed in order to find the complete curve of action.

Similarly, the graphical solutions shown in Figures 4 to 8 are for purposes of illustration only, and the points are in practice actually computed to determine the tooth profiles. In Figure 4 is shown the triangulation for determining the curves of action of bevel tooth forms incorporating the increased $h$ principle as set forth in the application of Charles C. Davis, Serial No. 384,421, filed on even date herewith.

The spherical triangle 15—16—18 is located in the same manner as in Figure 3 and the small circle 19 having the radius $h$ is similarly found. In order to obtain increased leverage in variable leverage bevel gears, according to the principles set forth in the Davis application Serial No. 384,421, the following basic triangulation is used.

With 18 as a pole another small circle 33 is located, having a radius $h'$ which is larger than $h$. To obtain an increase in variable leverage of 10 per cent over that obtained in Figure 3 the radius $h'$ should be approximately 16 per cent greater than the radius $h$. To obtain an increase of 20 per cent, $h'$ should be approximately 32 per cent greater than $h$. Proportionate increases can be computed from the figures given. The pressure angle used has an effect on this increase.

The great circle arc 17 passes through 18 and is perpendicular to 14. Where 17 crosses the circle 33 at 44 the great circle 34 is perpendicular to the great circle 17. In Figure 4, great circle arcs 14 and 34 appear parallel but actually, on the surface of a sphere, as here described, they will not be parallel, although both are perpendicular to the great circle 17. The great circle 34 intersects the great circles 18—15 and 18—16 (extended) at points 35 and 36.

The spherical triangle 35—36—18 is now rotated about its vertex 18 through an angle A sufficient to bring its base 34 to its new position at the required pressure angle B to the great circle 17.

This angle A is computed in the same manner as in Figure 3, using the value of $h'$ instead of the value of $h$.

Having rotated the triangle about its vertex, the ends of its base now are located at 37 and 38. With these points as poles, arcs 39 and 41 of small circles are located in circle 33, tangent to each other at 42 where the base 43 of the rotated triangle is tangent to circle 33. These arcs 39 and 41 within circle 33, and tangent at 42 are the desired curves of action of the gear and pinion teeth on which points must be found.

From the above description it is seen that the length of the curves of action of the bevel gear teeth can be increased to give a larger range of variable leverage.

The length of these curves of action is determined by computing the radius $h'$ of the small circle, rather than by making it of such length that the small circle having vertex 18 as a center is tangent to the great circle arc 14 connecting 15 and 16. As mentioned before the pressure angle used has an effect on the amount of increased leverage obtained.

As will be seen from the following description, the computed radius $h'$ of circle 33 rather than the radius $h$ of the smaller circle 19 can also be used when developing my new spur or bevel variable leverage tooth forms having increased pinion strength.

In the embodiment of Figure 5 wherein increased pinion strength is obtained, the spherical triangle 15—16—18, the small circle 33 having the computed radius $h'$, and the great circle 17 perpendicular to 14 are located as before. 45 is a second great circle, which is not perpendicular to 14 but which intersects the great circle 17 at 18, making a small angle 46 with 17.

At the point where 45 crosses the small circle 33 at 47 is located the great circle arc 48, perpendicular to 45 and tangent to the circle 33 at 47.

The great circle arc 48 intersects at 49 and 51 the extensions of the sides of the triangle 15—16—18, the arc 48 forming the base of a new spherical triangle 49—51—18 having the same vertex angle at 18.

The new spherical triangle 49—51—18 is rotated about its vertex 18 through an angle A sufficient to bring its base 48 into its position at 52 where it makes the required pressure angle B with the great circle arc 17. Arc 52 is tangent to the small circle 33 at 53. With 54 and 55 as poles, arcs of small circles 56 and 57, tangent to each other at 53, are located within the small circle 33. The arcs 56 and 57 are the curves of action of the gear and pinion teeth of this new tooth form. In this form the pinion tooth profile is thickened, particularly at its base, and the resulting set of gears has all of the characteristics of the increased variable leverage of the gears of Figure 4, plus stronger pinion teeth. In this form the increase in thickness of the pinion tooth can be controlled by varying the angle 46, and the length of the curves of action of the teeth is controlled by the radius $h'$ of circle 33, as before.

Figure 6 shows another embodiment wherein another method of controlling pinion tooth thickness is used, and wherein the pinion tooth is thickened an equal amount along its whole depth, while the gear tooth is reduced by an equal amount.

To develop this tooth form the method of Figure 4 is followed up to the point where 42 on the rotated base 43 is found. Curves of action drawn tangent at 42 would be the same as in Figure 4.

To increase the pinion tooth thickness the point 42 is moved along the base 43 to a new position at 58. Small circle arcs 59 and 61 are then located, having 37 and 38 as poles. These arcs 59 and 61 are tangent at 58 and cut the opposite side of the small circle 33 at 62 and 63. The parts between 62, 63 and 58 are the curves of action of the teeth. Thus it is seen that the points 37 and 38 are used as poles when locating the curves of action as before, but that relative pinion and gear tooth thickness is controlled by varying the radii used when locating the curves of action.

While in involute gear wheels the pitch circles remain constant, in variable leverage gears the instantaneous pitch circles will shift according to the relative position of the meshing teeth. Thus at each position of the meshing teeth there will be instantaneous pitch circles for the gear and pinion and although each pair of such instantaneous circles will be tangent, the point of tangency will shift along the line of centers of the gear and pinion.

For the gears to operate properly, and have the maximum amount of rolling contact with a consequent minimum of wear, I have found that the common normals through the points of contact of the mating teeth must pass through the point in the line of centers of the gears at which the instantaneous pitch curves are tangent.

In Figure 7, the tooth curves of action determined by the method of Figure 4 are shown in two extreme positions and in an intermediate position. When the common normal 43 crosses the line of centers at 64 the tangent circular arcs 11a and 12a having 15 and 16 as centers are located. These arcs are the instantaneous pitch circles of the gear and pinion teeth when contacting at 42 at one end of their curves of action. The common normal 43 passes through points 64 on the line of centers at which the instantaneous pitch circles are tangent.

When the teeth are contacting at the other extreme ends of their curves of action they are tangent at 65 as shown in Figure 7, and their common normal 66 cuts the line of centers at 67 where the instantaneous pitch circles 11b and 12b are tangent. The great circle arc 64—67 on the line of centers is the locus of the point of tangency of the instantaneous pitch circles.

When the teeth are contacting at the intermediate position shown, they are tangent at 70, their common normal is 68, and their instantaneous pitch circles 11c and 12c are tangent at 70.

In accordance with my discovery, the curves of action of the teeth within the circle in which they are inscribed, may be of other forms than the circular arcs shown. For example, the curve of action of the pinion teeth may be of parabolic or other suitable curved profile, in which case the curve of action of the gear will be conjugate thereto in such manner that the common normal to the curves of action of the mating teeth will pass through the point in the line of centers at which the instantaneous pitch circles are tangent. Practically, the curves of action also must be convex curves that can be cut or generated on commercial gear cutting machines.

*Outer profile generation*

Since variable leverage teeth do not give leverage variation throughout the entire cycle of engagement of the meshing teeth, it is necessary to provide outer profile curves on the outer ends of the curves of action on opposite sides of each tooth, in order to maintain the gears in proper engagement in the period between engagement of successive curves of action of mating teeth. In tooth profiles for variable leverage gears developed in accordance with the present invention, in each relative position of engagement of a mating pair of gears, two points on an engaging tooth, one on each side of the tooth, are in contact with points on the teeth of the meshing gear, and the common normals to the tooth profile and its mating teeth at their point of contact must pass through the point in the line of centers at which the instantaneous pitch circles are tangent, as described before. The proper tolerances to give the practically necessary backlash for the particular gears will of course be allowed in the practical manufacture of the gears. This is necessary to allow for proper lubricating films between the surfaces of the teeth, and in practice a uniform controlled backlash is provided.

In Figure 8 is shown the basic triangulation for obtaining a point on the outer tooth profile of the pinion which will satisfy the above-mentioned requirement, the curves of action of a pinion tooth and the curves of action of adjacent gear teeth in mesh with the pinion tooth being determined as in Figure 4. These curves of action and the prolongations thereof, developed on the surface of a sphere as in Figure 4, are shown in solid lines for the pinion and dotted lines for the gear in Figure 8.

Angle 16—15—37 is equal to angle 16—15—73 and arcs 15—37 and 15—73 are equal in length. Points 37 and 73 are the poles for the curves of action 39 and 77 respectively of adjacent gear teeth. Great circle arc 16—71 is equal to and makes angle 69 with 16—15. Point 71 represents the center of the gear when it has moved about point 16 through the angle 69. Great circle arc 72—74 is equal to arc 72—73 and meets great circle arc 71—74 at 74, arc 71—74 being equal to 15—73. Angle 84—71—74 equals angle 37—15—73 and arc 71—84 equals arc 15—37.

Point 74 is the pole of the curve of action 77 when moved to its new position at 78 when the gear center has been moved to 71. Similarly, point 84 is the pole for the curve of action 39 when moved to its new position at 83.

The arc 72—74 crosses the new line of centers 16—71 at point 82. Great circle arc 85 connects points 82 and 84. This arc 85 crosses the curve of action 83 at point 86.

This point 86 is a point on the outer tooth profile of the pinion tooth. A second or a series of points on the outer tooth profile of the pinion tooth can be determined in the same manner as point 86, and the points on the opposite profile 75 of the pinion tooth are laid out symmetrically with points 86, etc.

It is to be understood that points on the pinion outer tooth profile are not necessarily determined all of the way to the centerline of the pinion tooth, because after the gear has been rotated through a certain angle, the outer tooth profile 89 of the pinion loses contact with the gear profile 83 about the time that the profile 87 of the gear begins to engage profile 88 of the pinion, as is apparent from Figure 8. Thus, beyond the point where curves 89 and 83 lose contact, the end of the pinion tooth is preferably rounded as shown to continue the convex profile of the tooth and to strengthen it so as to increase the load capacity of the gear. It is to be understood, however, that these inactive portions will vary in size depending upon the size of the gears, the degree of variable leverage of the gears, and other factors. The bottom land of the teeth may be substantially flat or rounded in accordance with conventional gear design.

Points on the outer tooth profile of the gear teeth are determined in the same manner as described above, except that the center 16 of the pinion is rotated about point 15 from which point the above described procedure is repeated.

The outer tooth profiles determined by the method of Figure 8 obey the previously stated law that common normals through the points of contact of the mating teeth must pass through the point in the line of centers at which the instantaneous pitch curves are tangent. In Figure 8 the common normal 72—74 of the curves of action passes through point 82 in the line of centers 16—71 and the instantaneous pitch circles are tangent at 82. At the same time the common normal 85 of the curve of action of the gear and the outer profile of the pinion, passes through the same point 82 in the line of centers.

The outer tooth profiles of the other tooth forms of my invention are determined in the same manner as described above, once the curves of action have been determined.

High traction straight bevel gears having profiles of the type described above are preferably generated in a machine of the type described in Patent No. 1,656,633 having an additional translatory movement imparted to the cutting tool in accordance with the principles set forth in Patent No. 1,937,727, in order to generate the special tooth form herein disclosed. However it is to be understood that the machine or method by which the gears are cut or generated are not part of this invention, and that any other suitable machine or method may be used.

After the coordinates of a series of points on the surface of a sphere have been determined by spherical trigonometric methods and the desired tooth profiles are known, then the cams used to impart the additional translatory motion to the cutting tool to generate the teeth as taught by Patent 1,937,727 can be computed, as will be apparent to those skilled in the art.

Spiral bevel gear teeth

While the teeth cut on machines described in Patents 1,656,633 and 1,937,727 will be so-called straight sided bevel teeth, it is to be understood that curved sided bevel teeth such as spiral bevel gears may also embody the principles of my invention, since mating spiral bevel gears are usually generated with rotary cutters having different diameters so as to give a limited area of contact along the face width of engaging teeth. Particularly adaptable to the principles of my invention are spiral bevel gears having a substantially zero degree spiral angle, such as "Zerol" gears, which are described in the "Transactions of American Society of Mechanical Engineers" for October, 1938, page 560.

Spiral bevel teeth, whether they have a spiral angle or are of the "Zerol" type, can be considered as being made up of a number of straight bevel sections having short face widths. Each such section will roll with the corresponding section of the mating gear as a pair of straight bevel sections. Accordingly, bevel gear teeth profiles located on the surface of a sphere in accordance with my invention may be used for straight bevel gears, for spiral bevel gears or for "Zerol" gears. However, when incorporating my hi-traction principles in spiral bevel gears the spiral angle must be small enough so that only one curve of action of the driving gear is engaging one curve of action of the driven gear. Otherwise, if a plurality of curves of action of the driving gear are engaging a plurality of curves of the driven gear then the leverage between each pair of mating curves will be different and the variable leverage advantage will be lost.

Such spiral or "Zerol" bevel gears are preferably generated on a machine similar to that of Patent No. 1,656,633 with the exception that a rotary cutter or grinder of the type shown in Patents 1,325,784; 1,686,523; 1,724,241; or 2,000,215 is used and either the work or cutter is given an additional translatory motion in accordance with principles set forth in Patent No. 1,937,727 in order to generate the special tooth form of my invention. The gears may, however, be cut or generated in any desired manner.

Spur gear teeth

Although my improvements wherein the pinion teeth are strengthened and wherein the teeth have other than circular curves of action have been described above only with reference to bevel gears, the same principles are also applicable to high traction spur gears. When determining the profiles of spur gears in accordance with my invention they are found in the same manner as are the bevel gears of Figures 5 and 6 except that the layout is made on a plane surface, and a graphical solution is practical.

To graphically lay out Figure 5 for spur gears, draw the line 15—16, representing the distance between the centers of the gear and pinion respectively.

Rotate line 14 about 16 as a center, through an angle equal to 360° divided by four times the number of teeth in the pinion. Rotate line 14 about 15 as a center, through an angle equal to 360° divided by four times the number of teeth in the gear. The lines 91 and 92 will intersect at 18. Line 17 passes through 18 and is perpendicular to 14. Through point 18 draw line 45 making a small angle 46 with line 17. With 18 as a center draw a circle 33 having a radius $h'$ computed in accordance with the principles set forth in the application Serial No. 384,421 of Charles C. Davis, filed on even date herewith. Where circle 33 crosses line 45 at point 47 draw line 48 tangent to circle 33. Line 48 intersects lines 91 and 92 (extended) at points 51 and 49, respectively. Rotate the triangle 49—51—18 about 18 as a center through an angle A until its base 48 assumes the position shown at 52 where it makes the required pressure angle B with the line 17. Its base angles are now at 54 and 55. Line 52 is tangent to circle 33 and 53. From 54 as a center and with 53—54 as a radius, draw arc 56 within circle 33. From 55 as a center and with 53—55 as a radius, draw arc 57 within circle 33. Arcs 56 and 57, which are within circle 33 and are tangent at 53, are the curves of action of variable leverage spur gear teeth incorporating increased pinion strength according to one embodiment of my invention.

To thicken the spur pinion tooth along its whole length the method of Figure 6 is used. Working on a plane surface as in Figure 5, points 15, 16, 18, circle 33 and line 17 are laid out as in Figure 5. Where 17 crosses circle 33 at 44 a tangent 34 is drawn, meeting the extended sides of triangle 15—16—18 at 35 and 36. Triangle 35—36—18 is rotated about 18 as a center, through an angle A such as to bring its base 34 into its new position at 43 making the required pressure angle B with line 17. The base 43 is now tangent to circle 33 at point 42. Tooth profiles laid out having 37 and 38 as their centers and tangent at 42 would incorporate the increased $h$ in accordance with the principles of the application of Charles C. Davis, Serial No. 384,421, filed on even date herewith. In order to strengthen the pinion teeth in accordance with this embodiment of my invention, a point 58 is established on line 43 but spaced from point 42 and closer to point 37 as shown. Then curves of action 59 and 61 are drawn within circle 33, tangent at point 58 and having their centers at 37 and 38 respectively. Pinion teeth laid out in accordance with this embodiment will be thicker while the gear teeth will be thinner than if their curves of action are made tangent at point 42.

Points on the outer tooth profiles are found by rotating the center of one gear about that of the other and determining the point when a common normal to the outer tooth profile and the mating tooth, at the point of contact, will pass through the required point in the line of centers at which the instantaneous pitch circles are tangent, as previously described.

It is to be understood that the principles of my invention, wherein the pinion teeth are strengthened, and wherein teeth having other than circular curves of action, but which have common normals at their points of contact and passing through the point in the line of centers at which the instantaneous pitch circles are tangent, may also be applied to bevel gear teeth laid out on the developments of the back cones of the gear and pinion, as described in Patent No. 2,009,915, although, as pointed out before, profiles determined in this manner are not entirely satisfactory.

In laying out the teeth on the developments of the back cones on a plane surface, taking Figure 5 as an example, the distance 15—16 will be equal to the sum of the back cone distances of the gear and the pinion. Line 14 is rotated about point 16 through an angle equal to 360 degrees divided by four times the number of teeth in the back cone diameter of the pinion, when the number of teeth in the back cone diameter is equal to the number of teeth in a spur gear having the same circular pitch as those of the bevel gear and with a pitch circle equal to the back cone distance of the bevel pinion. Usually there will be a fractional number of teeth in the back cone diameter. Line 14 is then rotated about point 15 through an angle equal to 360 degrees divided by four times the number of teeth in the back cone diameter of the gear.

Point 18 is the apex of the triangle 15—16—18 formed by rotating line 14 as described. Circle 33 is drawn about point 18 as a center, having the desired computed radius $h'$. From this point on the procedure of laying out the tooth forms is the same as that previously described for spur gears, the resulting tooth curves of action being the development on a plane surface of the curves of action of the gear and pinion on their back cones.

The outer profiles are preferably determined by cutting out the back cone development of the curves of action, as laid out above, forming the developments into cones corresponding to the gear and pinion back cones, and determining points on the outer tooth profiles such that a common normal to an outer tooth profile when it contacts the curve of action of a tooth of its mating gear will pass through the same point in the line of centers as the common normal to simultaneously contacting curves of action of mating teeth, the said point occurring on the line of centers when the instantaneous pitch circles are tangent.

When laying out the curves of action of the strengthened pinion teeth of Figure 6 by the back cone method, the distance 15—16, point 18 and circle 33 are found in the same manner as for Figure 5. From this point on the development is laid out as for spur gears as previously described. The outer tooth profiles are also determined in the same manner as described relative to Figure 5.

Since the main pitch circles of the gear and pinion and their tangent point are not used in the computations, they are not shown, in order to simplify the drawings. For the same reason, the back cone circles and their tangent point, in the case of bevel gears laid out by the back cone method, are not shown. In the case of a 7-12 tooth combination of spur gears or bevel gears computed by the spherical method, the tangent point of the main pitch circles will be tangent at a point $7/19$ of the distance from 16 to 15 along the line or arc 14. In the case of bevel gears laid out by the back cone method the back cone circles will be tangent at a point on the line 16—15 and their radii will be proportional to the back cone distances of the respective pinion and gear.

Variable leverage gears embodying the improvements of my invention are the most satisfactory gears yet devised. Gears having curves of action and outer tooth profiles determined in accordance with the principles of my invention may be succesfully generated in quantity production machines. Uniform backlash is obtained and tooth interference is eliminated, this being an important factor in the maintenance of uniform backlash in the gearing.

By means of my invention the teeth of the smaller gear or pinion can be strengthened while retaining the variable leverage characteristics of the gears, this being of particular advantage where these teeth would be otherwise weakened due to the size of the hub.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A mating gear and pinion having tooth profiles including curves of action and outer tooth profiles of such shape that the common normal to their mating curves of action at their point of contact will cross the line of centers of the gears at a different point for different positions of the gears, and the same points will be simultaneously crossed by the common normal to a simultaneously mating curve of action and outer tooth profile.

2. A mating gear and pinion having tooth profiles including curves of action and outer tooth profiles, of such shape that the common normal to an outer tooth profile and its mating curve of action will pass through the same point in the line of centers of the gear and pinion that the simultaneous common normal to the mating curves of action at their point of contact passes, and wherein said point shifts substantially along said line of centers with rotation of said gears.

3. A mating pair of variable leverage gears having tooth profiles including curves of action and outer tooth profiles, of such shape that for each relative position of meshing engagement of the gears a point on each side of the profile of one tooth will substantially engage a point on each of the adjacent profiles of the mating teeth of the other gear, and wherein common normals to the profiles at each contact point will intersect at a point in the line of centers of the gears, said point shifting substantially along said line of centers with rotation of said gears.

4. A meshing variable leverage bevel gear and pinion having tooth forms including curves of action and outer tooth profiles corresponding substantially to curves determined by locating on the surface of a sphere, the center of which represents the intersection of the gear and pinion axes, a spherical triangle having as a base an arc of a great circle, said great circle connecting the intersections of the gear and pinion axes with the surface of the sphere, and the sides of said triangle being arcs of great circles making angles to said base equal to 360 degrees divided by four times the number of teeth in the gear and pinion respectively; said triangle being rotated about its apex as a pole through an angle sufficient that the base of the triangle represents the pressure angle of the teeth, locating a small circle tangent to the base of said rotated triangle and having the apex of said triangle as a pole; determining in said small circle two arcs of small circles, said arcs comprising the arcs of action of the gear and pinion, lying tangent at the point where said small circle is tangent to said base and having as their poles the ends of the base of said triangle; said tooth forms including outer tooth profiles of such form that a common normal to an outer tooth profile and the mating tooth on the other gear at their point of contact will pass through the point at which the instantaneous pitch circles of the gears are tangent.

5. A meshing variable leverage bevel gear and pinion having tooth forms including curves of action and outer tooth profiles corresponding substantially to curves determined by locating on the surface of a sphere, the center of which represents the intersection of the gear and pinion axes, an arc of a great circle connecting the intersections of the gear and pinion axes with the surface of the sphere; determining two sides of a spherical triangle having said arc as a base and making angles therewith determined by the number of teeth in the corresponding gear and pinion respectively, said sides intersecting at a vertex; locating a small circle having said vertex as a center, the radius of said circle being determined by the desired variation in leverage; locating an arc of a great circle tangent to said small circle and intersecting said sides, extended if necessary, to form the base of a second spherical triangle; said second triangle being rotated about said vertex as a pole through an angle determined by the desired tooth pressure angle; determining the location of arcs of small circles within said small circle, said arcs being tangent where they intersect the base of said rotated triangle, and having their centers on said base on opposite sides of said tangent point, the arcs located in said small circle comprising the curves of action of the gear and pinion teeth; said teeth having outer tooth profiles which contact a mating tooth profile in such a manner that a common normal at that point of contact passes through the point where the instantaneous pitch circles of the gears are tangent.

6. A meshing variable leverage bevel gear and pinion having tooth forms including curves of action and outer tooth profiles corresponding substantially to curves determined by locating on the surface of a sphere, the surface of which represents the intersection of the gear and pinion axes, an arc of a great circle connecting the intersections of the gear and pinion axes with the surface of the sphere; determining two sides of a spherical triangle having sides making angles with said great circle determined by the number of teeth in the corresponding gear and pinion respectively, said sides intersecting at a vertex; determining a small circle having said vertex as a center, the radius of said circle being determined by the desired variation in leverage; locating an arc of a second great circle tangent to said small circle and intersecting said sides, extended if necessary, to form the base of a second spherical triangle; said second triangle being rotated about said vertex as a pole through an angle determined by the desired tooth pressure angle; determining the location of arcs within said small circle, said arcs being tangent where said small circle is tangent to the base of said rotated triangle, said arcs comprising the curves of action of the gear and pinion teeth and having their convex portions facing each other, said arcs being of such shape that in any position of meshing engagement of the curves of action the common normals through the points of contact of the mating curves of action will pass substantially through the point in the line of gear centers at which the instantaneous pitch circles are tangent, and will shift along the line of centers as the gears including said curves of action are rotated, the outer tooth profiles having such forms that the common normal thereto and to a mating tooth at their point of contact simultaneously passes through the same tangent point of said instantaneous pitch circles.

7. A meshing variable leverage bevel gear and pinion having tooth forms including curves of action and outer tooth profiles corresponding substantially to curves determined by locating on the surface of a sphere, the center of which represents the intersection of the gear and pinion axes, an arc of a great circle connecting the center points determined by the intersections of said axes with the surface of said sphere and forming the base of a spherical triangle; locating the other two sides of said triangle which meet the ends of said base at angles determined by the number of teeth in the corresponding gear and pinion respectively, said sides intersecting at a vertex; locating a small circle having said vertex as a center, the radius of said circle being determined by the desired variation in leverage; locating a second great circle arc passing through said vertex and perpendicular to the base of said spherical triangle; locating a third great circle arc perpendicular to said second great circle arc, tangent to said small circle, and intersecting the sides of said triangle, extended if necessary to form the base of a second spherical triangle having the same vertex; said second triangle being rotated about said vertex as a pole, through an angle determined by the desired tooth pressure angle; locating small circle arcs within said small circle, said arcs being tangent where said rotated base is tangent to said small circle and having their centers on said rotated base at opposite sides of said tangent point, the curves located in said small circle comprising the curves of action of the gear and pinion teeth; said teeth having outer tooth profiles of such outline that a common normal thereto and to a mating tooth at their point of contact will pass through the tangent point of the instantaneous pitch circles of the mating gears.

8. A meshing variable leverage bevel gear and pinion having tooth forms including curves of action and outer tooth profiles corresponding substantially to curves determined by locating on the surface of a sphere, the center of which represents the intersection of the gear and pinion axes, an arc of a first great circle connecting the center points determined by the intersections of said axes with the surface of said sphere, and forming the base of a spherical triangle; locating the other two sides of said triangle which make angles with the ends of said base determined by the number of teeth in the corresponding gear and pinion respectively, said sides intersecting at a vertex, locating a small circle having said vertex as a center, the radius of said circle being determined by the desired variation in leverage; locating a second great circle arc passing through said vertex and perpendicular to said base; determining the location of a third great circle arc at other than a perpendicular angle to said second great circle arc, tangent to said small circle and intersecting the sides of said triangle, extended if necessary, to form a second spherical triangle having the same vertex; said second triangle being rotated about said vertex as a pole through an angle determined by the desired tooth pressure angle; determining the location of small circle arcs within said small circle, said arcs being tangent where said rotated base is tangent to said small circle and having their centers substantially at the ends of said rotated base at opposite sides of said tangent point, the curves inscribed in said small circle comprising the curves of action of the gear and pinion teeth.

9. A meshing variable leverage bevel gear and pinion having tooth forms including curves of action and outer tooth profiles corresponding substantially to curves determined by locating on the surface of a sphere, the center of which represents the intersection of the gear and pinion axes, an arc of a first great circle connecting the center points determined by the intersections of said axes with the surface of said sphere, and forming the base of a spherical triangle; determining the location of the other two sides of said triangle making angles with said base determined by the number of teeth in the corresponding gear and pinion respectively, said sides intersecting at a vertex, locating a small circle having said vertex as a center, the radius of said circle being determined by the desired variation in leverage; locating a second great circle arc passing through said vertex and perpendicular to said base; determining the location of a third great circle arc perpendicular to said second great circle arc, tangent to said small circle, and intersecting the sides of said triangle, extended if necessary, to form the base of a second spherical triangle having the same vertex; said second triangle being rotated about said vertex as a pole through an angle determined by the desired tooth pressure angle; determining the location of a point on the base of said rotated triangle spaced from the tangent point of said small circle by an amount depending upon the desired thickness of the gear and pinion teeth; and determining the location of arcs within said small circle, said arcs lying tangent to each other at said point and having their poles located substantially at the ends of the base of said rotated triangle, said last mentioned arcs comprising the curves of action of the gear and pinion teeth.

10. A gear and pinion having tooth forms described in claim 9 and having outer tooth profiles of such form that a common normal thereto and to the profile of the mating tooth will pass through the point at which the instantaneous pitch circles are tangent.

11. A meshing variable leverage gear and pinion having tooth forms including curves of action and outer tooth profiles corresponding substantially to curves developed by determining the location of a first triangle having a base extending between points established as the gear centers and having its base angles determined by the number of teeth in one of the gears; locating a circle having said apex as a center and with a radius exceeding the altitude of said triangle and determined by the desired ratio of variable leverage; locating a line tangent to said circle, said line meeting the sides of said triangle, extended if necessary, to form a second triangle; said second triangle being rotated about its apex as a center through an angle sufficient that its base makes an angle with the base of the first triangle complementary to the desired tooth pressure angle; determining the location of arcs within said circle, said arcs constituting the curves of action, and lying tangent to each other where they cross the rotated base and having their centers on the rotated base of said second triangle on opposite sides of their point of tangency; said tooth forms also including outer tooth profiles of such form that a common normal thereto and to the tooth of the mating gear at their point of contact will pass substantially through the point at which the instantaneous pitch circles are tangent.

12. A gear and pinion having tooth forms as described in claim 11 wherein the base of said second triangle, before being rotated, is perpendicular to a line which is perpendicular to the base of said first triangle, and wherein the curves of action of the teeth inscribed in the circle are tangent at a point on the rotated base of said second triangle removed from the point where said rotated base is tangent to said circle.

13. A meshing variable leverage gear and pinion having circular curves of action, wherein the radii of the curves of action of the gear and pinion are greater than the respective radii of the instantaneous pitch circles of the gear and pinion when the curves of action are in meshing engagement at a point in the line of centers of the gear and pinion, and wherein the ratio of the increase in the radius of the curve of action of the pinion to the increase in the radius of the curve of action of the gear is greater than the ratio of the radius of the said instantaneous pitch circle of the pinion to the radius of the instantaneous pitch circle of the gear.

14. A meshing variable leverage bevel gear and pinion having tooth profiles which, when laid out on the back cone developments of the gear and pinion, include circular curves of action, wherein the radii of said curves of action of the gear and pinion are greater than the respective back cone distances of the gear and pinion, and wherein the ratio of the increase in the radius of the curve of action of the pinion to the increase in the radius of the curve of action of the gear is greater than the ratio of the back cone distance of the pinion to the back cone distance of the gear.

15. A meshing variable leverage bevel gear and pinion having tooth forms, the back cone developments of which have substantially circular convex curves of action having common normals at their point of contact in all positions of meshing engagement, said common normals in each position of meshing engagement passing through a point in the line of centers of the back cone developments at which the back cone developments of the instantaneous pitch circles are tangent, said tooth forms having outer tooth profiles of such form that the common normal to an outer tooth profile and to a tooth of a mating gear at their point of contact will pass through the point in the line of centers at which the instantaneous pitch circles are tangent.

16. Tooth forms for mating variable leverage bevel gears and pinions having curves of action corresponding substantially to curves developed by laying out a triangle having a base equal to the sum of the back cone distances of the gear and pinion and having sides making angles with the base equal to 360 degrees divided by four times the number of teeth in the back cone diameter of the gear and pinion respectively, said sides intersecting at the apex of said triangle; drawing a circle about said vertex as a center, having a radius computed by the variable leverage desired; drawing a line tangent to said circle and making an acute angle with said base; said line meeting the extended sides of said triangle to form a second triangle; rotating said second triangle about its vertex through an angle such that its base represents the desired tooth pressure angle; its base now lying tangent to said circle at a new point; and from the ends of the base of said rotated triangle as centers inscribing circles within said second circle, said last named circles lying tangent to each other at said new point.

17. Tooth forms for mating variable leverage bevel gears and pinions having curves of action corresponding substantially to curves developed by laying out a triangle having a base equal to the sum of the back cone distances of the gear and pinion and having sides making angles with the base equal to 360 degrees divided by four times the number of teeth in the back cone diameter of the gear and pinion respectively, said sides intersecting at the apex of said triangle; drawing a second circle about said vertex as a center, having a radius determined by the desired variable leverage; drawing a line tangent to said circle and parallel to said base, said line meeting the sides of said triangle, extended if necessary, to form a second triangle; rotating said second triangle about its vertex through an angle such that its base represents the desired tooth pressure angle, its base now lying tangent to said circle at a new point, establishing a fourth point on said rotated base but slightly spaced from said new point; and from the ends of said rotated base as centers inscribing circular arcs within said second circle, said circular arcs lying tangent to each other at said fourth point.

18. Tooth forms for mating variable leverage gearing having curves of action corresponding substantially to curves developed by laying out a first triangle having a base drawn to a definite scale between points established as the gear centers, and sides at angles to said base equal to 360 degrees divided by four times the number of teeth in the respective gears; drawing a circle having the apex of said triangle as its center and having a radius determined by the desired variation in leverage; drawing a line tangent to said circle and making a slight angle with the base of said first triangle; said line meeting the sides of said triangle, extended if necessary, to form a second triangle; rotating said second triangle about its apex through an angle sufficient that the base represents the desired pressure angle of the teeth, said rotated base now lying tangent to said circle at a new point; and from the ends of said rotated base as centers inscribing circular arcs within said circle, said arcs lying tangent at the point where said rotated base is tangent to said circle.

19. Tooth forms for mating variable leverage gearing having curves of action corresponding substantially to curves developed by laying out a first triangle having a base drawn to a definite scale between points established as the gear centers, and sides at angles to said base equal to 360 degrees divided by four times the number of teeth in the respective gears; drawing a circle having the apex of said triangle as its center and having a radius determined by the desired variation in leverage; drawing a line tangent to said circle and parallel to said base; said line meeting the sides of said triangle, extended if necessary, to form a second triangle; rotating said second triangle about its apex through an angle sufficient that the base represents the desired tooth pressure angle, said rotated base now lying tangent to said circle at a new point; locating a new point on said base slightly spaced from said tangent point; drawing circular arcs within said circle, having the ends of said rotated base as centers and lying tangent to each other at said new point.

ARTHUR P. WOODS.